United States Patent [19]

Maurer et al.

[11] Patent Number: 4,937,065

[45] **Date of Patent: * Jun. 26, 1990**

[54] PROCESS FOR THE CHEMICAL-THERMAL DEGRADATION OF HAOLGENATED HYDROCARBONS

[75] Inventors: Paul-Gerhard Maurer, Neuberg; Daniel Neupert, Alzenau, both of Fed. Rep. of Germany

[73] Assignee: Nukem GmbH, Frankfurt am Main, Fed. Rep. of Germany

[ * ] Notice: The portion of the term of this patent subsequent to Mar. 31, 2004 has been disclaimed.

[21] Appl. No.: 281,934

[22] Filed: Dec. 6, 1988

Related U.S. Application Data

[63] Continuation of Ser. No. 858,750, May 2, 1986, abandoned.

[30] Foreign Application Priority Data

May 11, 1985 [DE] Fed. Rep. of Germany ....... 3517019

[51] Int. Cl.[5] .......................... F23G 7/00; F23B 7/00; C01B 7/00; C01F 11/02

[52] U.S. Cl. .................................... 423/659; 423/240; 423/163; 423/DIG. 20; 106/724; 110/237; 110/342; 110/346

[58] Field of Search ............ 423/210 C, 210 S, 245 R, 423/240 R, 249 S, 210.5, 654, DIG. 12, 163; 110/237, 238, 245, 246, 342, 346; 106/103

[56] References Cited

U.S. PATENT DOCUMENTS

| | | | |
|---|---|---|---|
| 3,845,191 | 10/1974 | Bruce, Jr. | 423/497 |
| 3,864,458 | 2/1975 | Roberts | 423/554 |
| 3,888,193 | 6/1975 | Kishigami et al. | 110/245 |
| 4,001,031 | 1/1977 | McCord et al. | 106/103 |
| 4,022,630 | 5/1977 | Watson et al. | 106/103 |
| 4,081,285 | 3/1978 | Pennell | 106/103 |
| 4,301,137 | 11/1981 | Williams et al. | 423/481 |
| 4,352,332 | 10/1982 | Baston | 110/346 |
| 4,375,986 | 3/1983 | Pichat | 106/118 |
| 4,654,203 | 3/1987 | Maurer et al. | 423/245 |

OTHER PUBLICATIONS

Riegel, E. P., Industrial Chemistry, 5th Edition, 1949, Reinhold Publishing, N.Y., N.Y., pp. 163, 170.

*Primary Examiner*—Gary P. Straub
*Attorney, Agent, or Firm*—Cushman, Darby & Cushman

[57] ABSTRACT

Halogenated hydrocarbons are reacted in a reactor at temperatures up to 1000° C. with greater-than-stoichiometric amounts of calcium and/or magnesium silicates in a reactor for the chemical-thermal degradation of the halogenated hydrocarbons. Neither dioxins nor furans are formed in the waste gas in this process.

8 Claims, No Drawings

PROCESS FOR THE CHEMICAL-THERMAL DEGRADATION OF HAOLGENATED HYDROCARBONS

This is a continuation of application Ser. No. 06/858,750, filed May 2, 1986, which was abandoned upon the filing hereof.

The invention relates to a process for the chemical-thermal degradation of halogenated hydrocarbons, especially polyhalogenated hydrocarbons, by reaction with a greater-than-stoichiometric amount of alkaline solids at fairly high temperatures in a reactor.

BACKGROUND OF THE INVENTION

Polyhalogenated hydrocarbons are employed very frequently in industry and research. Thus, fluorocarbons serve as propellant gases and refrigerants and are the starting materials for the manufacture of plastics which are very chemically resistant. Chlorinated hydrocarbons are employed in great quantities as degreasing agents in metal-working plants. Other areas of application include a wide variety of chemical purifications. In addition, chlorinated hydrocarbons are the starting materials for the manufacture of polymers, pesticides, and herbicides. The polychlorinated hydrocarbons are particularly useful as heat-transfer oils or hydraulic fluids because of their high chemical and thermal resistance. The polychlorinated biphenyls (PCB) are typical representatives of this class of substances.

Recycling of spent hydrogenated hydrocarbons is exploited as far as technically possible and economically feasible. Nevertheless, about 30,000 to 40,000 tons of chlorinated hydrocarbons, which have a chlorine content $>20\%$ accumulate annually in West Germany alone, even though these materials ought to be disposed of.

In addition to residues from recycling plants and production residues, there are so-called special wastes which include substances the use of which is increasingly more restricted because of safety and environmental regulations. These also must finally be disposed of. The best known examples of these special wastes are the polychlorinated biphenyls, which, in the past, have primarily been used as transformer oils and dielectrics in capacitors. In West Germany, every year for the next 10 years, it will be necessary to deal with about 6,000 tons of polychlorinated biphenyls which must be disposed of solely due to the replacement of these fluids by substitutes.

Incineration at sea is currently regarded as a major possibility for the disposal of halogenated hydrocarbons. However, international agreements (the Oslo and London Conventions), have as their object the total elimination of incineration at sea by the end of this decade. Therefore, incineration on land remains the sole alternative.

Problems are encountered when halogenated hydrocarbons, especially fluorinated and polychlorinated hydrocarbons, are incinerated in existing special waste incineration facilities. The major causes of the problems are the risk of corrosion of brick linings and waste gas lines by a high hydrogen halide (HF and HC1) concentration in the crude gas, the need to avoid emissions, especially in the incineration fluorinated hydrocarbons, and the high energy expenditure.

This disposal method is being increasingly criticized, particularly because highly toxic polychlorinated dibenzodioxins and dibenzofurans can be produced during incineration of chlorinated hydrocarbons under inadequate incineration conditions.

In Unexamined West German Patent Application No. 30 28 193 a process is disclosed for the pyrolytic degradation of halogen- and/or phosphorus-containing organic substances, in which said substances are converted after being combined with calcium oxide/calcium hydroxide at a greater-than-stoichiometric ratio and at temperatures of 300° to 800° C. in a reactor.

A disadvantage of this process is the fact that not all halogenated hydrocarbons can be degraded without difficulty. The temperatures necessary for the quantitative degradation of chemically and thermally very stable polyhalogenated hydrocarbons, which must include the polychlorinated biphenyls in particular, are higher than 600° C. Above this temperature, mixtures of CaO and $Ca(OH)^2$ form melts with the corresponding calcium chlorides. This causes serious problems, because the required continuous passage of the solid through the reactor is hindered thereby and even rendered impossible under certain conditions. In addition to the process-engineering problems, the formation of melts concurrently results in a considerable decrease in the degradation rate for the halogenated hydrocarbons. This can be attributed to the extensive reduction in the surface of the solid reactants, which has a major effect on the reaction gas-solid reactions. Even a substantial excess of the indicated basic compounds cannot prevent melt formation with subsequent encrustation in the cool-down phase at temperatures above 600° C.

Unexamined West German Patent Application No. 34 47 337 discloses a process that prevents the formation of melts in the 600–800° C. temperature range by providing calcium oxide and/or calcium hydroxide in at least two fold stoichiometric excess relative to the halogen to be removed, and which the reaction mixture also contains 2 to 30% by weight of iron oxide.

A disadvantage of this process is the fact that the temperature of 800° C. must not be exceeded, if incrustation is to be prevented with a high degree of certainty. However, avoidance of incrustation is a necessary prerequisite for the successful outcome of this degradation process. A temperature of 800° C. is sufficient for the conversion of PCB's which are chemically and thermally very stable, but the reaction of the perhalogenated hydrocarbons with CaO is very exothermic. Thus, a considerable increase in temperature, which then must be limited to 800° C. by appropriate steps, occurs in the reactor at a correspondingly higher feed rate. This increase in temperature can be reduced by partial replacement of CaO by $Ca(OH)_2$. However, water is formed from the $Ca(OH)_2$. The water in turn reacts at 800° C. with the calcium chloride formed from the chlorinated hydrocarbons at 800° C., converting it to hydrogen chloride.

The hydrogen chloride is thus formed is an unwanted component of the waste gas. Therefore, efforts must be made during this process to limit the reaction temperature to 800° C., which in practice amounts to limiting the feed rate of the halogenated hydrocarbons.

SUMMARY OF THE INVENTION

Therefore, the present invention has as its object the development of a process for the chemical-thermal degradation of halogenated hydrocarbons, especially polyhalogenated hydrocarbons, by reaction with a greater-than-stoichiometric amount of alkaline solids at fairly high temperatures in a reactor. The process is carried out in a way which prevents incrustation of residual substances, even at temperatures over 1000° C. Thus the process is not critical in relation to temperature management, permits high feed rates for halogenated hydrocarbons, and produces a halogen-free waste gas.

This object is achieved according to the invention by using calcium and/or magnesium silicates as the alkaline solids. Preferably, the calcium or magnesium silicates are orthosilicates such as for example $Ca_2SiO_4$, $Ca_3Si_2O_7$ and $Ca_3Si_3O_9$, metasilicates such as $CaSiO_3$, band silicates such as $Ca_3Si_4O_{11}$, or tectosilicates such as $CaSi_2O_5$. These silicates can be used as naturally occurring minerals such as, for example, wollastonite or tobermorite, or synthetically produced. However, care must be taken to ensure that during preparation the melting points of the silicates in question should not be reached to avoid the formation of a glassily solidified product with only a small surface and porosity.

In accordance with the invention, it was surprisingly found that, for example, calcium silicates react with halogenated hydrocarbons to form the corresponding calcium halides and silicon dioxide at temperatures of 400° to 1000° C., without baking or incrustation of the reaction products. As relevant investigations have shown, the Si02 skeleton is retained even during quantitative conversion of the calcium in the silicate into calcium halide. At the same time, the calcium halide formed is finely distributed within the Si02 skeleton, so that no incrustation occurs even at 1000° C.

Because the calcium is leached out from the crystal structure during the reaction of halogenated hydrocarbon with calcium silicate, a loose structure is formed as the reaction progresses. That is, there is increasing use of the solid reaction product which, at the same time, promotes the diffusion of the halogenated hydrocarbon into the solids. As a result, a smaller stoichiometric excess of the solid reactant suffices for the quantitative reaction of halogenated hydrocarbons with calcium silicates than when calcium oxide or calcium hydroxide are used.

For the quantitative conversion of a halogenated hydrocarbon, it is sufficient that the calcium or magnesium silicate be present in a 1.2-fold stoichiometric excess relative to the halogen which is to be removed and for its conversion to calcium halides as a basis. Preferably, an approximately 1.5-fold excess is used.

Magnesium silicates can be used equally well in place of calcium silicates, and it also is possible for a portion of the calcium or magnesium in the silicate to be replaced by other metal cations such as, for example, iron.

Furthermore, synthetic silicates or silicate hydrates of calcium or magnesium, which contain free excess calcium oxide or magnesium oxide, can be used as well.

The chemical reaction of halogenated hydrocarbons with silicates is less strongly exothermic than the comparable reaction with calcium oxide, so that there is a smaller increase in temperature in the reactor at comparable feed rates. This can be significant in the selection of material for the reactor.

The reaction of halogenated hydrocarbons with silicates proceeds in the presence of an inert gas at standard pressure, i.e., 1 atmosphere.

The use of silicates in the form of granules or in lumpy form proved to be quite advantageous. Such granules can be manufactured by a simple pelletizing or aggregation process, for which commercial cements or ground raw cement clinker and water can be used as starting materials.

Preferably, cement clinker, sandy limestone and/or gas concrete are employed as alkaline solids.

The use of granules makes it possible to perform the reaction in the most widely differing reactors. Thus, in the simplest case, a cartridge can be filled with silicate granules, and the cartridge is then heated to a reaction temperature of 450°-700° C. Then, the halogenated hydrocarbon is metered in either in liquid or in gaseous form. The chemical-thermal degradation occurs as the halogenated material is introduced, while the halogen-free waste gas flows freely through the granule bed and can emerge at the other end of the cartridge. After about 80-85% of the granular charge has been utilized, the latter can be renewed or the cartridge of an appropriately inexpensive design can be totally replaced.

For a continuous chemical-thermal degradation of a halogenated hydrocarbon with calcium silicates, a shaft furnace may be used, which contains a calcium-silicate granular charge in the form of a moving bed, with the halogenated hydrocarbon and the evolving waste gas streaming through the charge in parallel or in counterflow.

The use of synthetically manufactured porous calcium silicate in granulated form has proved to be very advantageous. As an example, the appropriate granules can be prepared for example by comminution of silicate-rich building materials, such as gas concrete blocks or sandy limestone. These materials are mechanically and thermally sufficiently stable to be used as charge in a moving-bed reactor and, moreover, they have a very large surface. This material can be reacted with the halogenated hydrocarbons almost stoichiometrically relative to the calcium content.

The gaseous reaction products formed during the chemical-thermal degradation of halogenated hydrocarbons with silicates are free of halogens. In the case of non-perhalogenated hydrocarbons, methane, and possibly other —partially saturated and partially unsaturated—low hydrocarbons, as well as carbon monoxide and carbon dioxide. In this case, the waste gas has a considerable calorific value and can be utilized appropriately or also simply afterburned into carbon dioxide and water in an afterburner.

The process according to the invention, for the chemical-thermal degradation of polyhalogenated hydrocarbons by reaction with calcium silicates or magnesium silicates, is an environmentally compatible and cost-effective process for the disposal of said substances. Formation of metabolites such as polychlorinated dibenzodioxins or furans has not been observed in a single case.

The process embodying the invention for the chemical-thermal degradation of halogenated hydrocarbons will now be described with reference to the following examples.

EXAMPLE 1

About 250 g of gas concrete in granular form was charged into a reaction tube made of aluminum-oxide ceramic with a principal grain fraction of about 4 mm. The filled reaction tube is closed at both ends and fixed vertically in tubular furnace and heated to 700° C. Then, a total of 70 g of polychlorinated biphenyls (PCE) with an average chlorine content of 60% by weight is metered in from above over a 3-hour period via a capillary into the reaction tube and, at the same time, nitrogen preheated to 650° C. is passed at standard pressure through the reactor from top to bottom. During this process, the nitrogen volumetric-flow rate is about 5 to 10 meters per hour. The nitrogen leaves the bottom of the reactor together with the gaseous reaction products and is conducted through a washing section.

At the beginning of the reaction, the temperature in the reaction zone in the upper portion of the charge rises due to the exothermic reaction of PCB with Ca silicate. During the reaction, the reaction zone, whose temperature is approximately 820° to 850° C. migrates downwardly so that, by measuring the temperature, the time when the capacity of the charge is exhausted can be determined.

The composition of the gas concrete used as the solid reactant was determined to be a mixture of 58% by weight of $Ca_3Si_2O_7$, $H_2O$, and 42% by weight of alpha-quartz.

The chemical analysis of the reaction products was carried out by analysis of the residue of the wash solution and analysis of solid residues. No PCB was detected with a detection limit of 20 micrograms of PCB in the wash solution, from which a conversion degree of 99.99996% was calculated. Formation of metabolites, such as chlorinated dibenzodioxins or dibenzofurans, does not occur during the chemical-thermal degradation of PCB described herein. The compounds mentioned above could not be detected with a detection limit of 10 nanogram. The solid granules were still free-flowing even after the reaction and showed no sign of baking whatsoever. The main components of the solid granules in the residue were $SiO_2$ and $CaCl_2$. Moreover, the solid residue still contained residual amounts of calcium silicate, as well as small amounts of elemental carbon. The chlorine metered into the reactor in the form of PCB was quantitatively recovered as chloride in the solid residue after the chemical-thermal degradation of PCB. The waste gas was halogen-free and still contained essentially CO and $H_2$ in addition to nitrogen.

EXAMPLE 2

The procedure of Example 1 is repeated, but cement is used instead of gas concrete. In order to be able to carry out the reaction in a reaction tube, as described in Example 1, porous granules were prepared from the cement powder, as follows:

300 g of portland cement was mixed with 140 g of water. After a setting time of 24 hours, the test sample was dried at 600° C., during which almost all of the tempering water was expelled from the test sample. The cement was broken up into small pieces after drying and cooling, and was used as the charge for the reaction tube.

Conversion rates as good as those in Example 1 were achieved. The solid residue showed no sign of baking and was free-flowing.

EXAMPLE 3

The procedure of Example 2 is repeated, but raw cement clinker, an initial product in cement manufacture, is used instead of portland cement.

The test result is comparable to the results described in the Examples 1 and 2.

EXAMPLE 4

The procedure of Example 1 is used, but a synthetically produced porous tricalcium silicate in granular form is used instead of the gas concrete. The preparation of that material is as follows:

168 g of burned lime is combined with 60 g of quartz sand and ground until fine. Thereafter, the mixture is mixed with water to form a dough-like mass and combined with 0.6 aluminum powder. The mass expands within a short time. The sample is then heated to 200° C. in an autoclave in a steam atmosphere. A solid porous product is formed, which is broken up in a jaw crusher into granules with an average particle size of about 5 mm.

We also incorporate by reference the entire contents of West German Patent Application No. P 35 17 019.0 filed on May 11, 1986.

What is claimed:

1. In a process for the chemical-thermal degradation of halogenated hydrocarbons, which comprises charging a reactor with halogenated hydrocarbons and a material which contains a greater-than-stoichiometric amount of alkaline solids and heating the reactor to an elevated temperature under an inert gas atmosphere, the improvement wherein the said material consists essentially of a member of the group consisting of calcium silicates, magnesium silicates and mixtures of calcium and magnesium silicates.

2. A process as set forth in claim 1 in which the halogenated hydrocarbons are polyhalogenated hydrocarbons.

3. The process as set forth in claim 1, wherein the alkaline solids are orthosilicates, metasilicates, band silicates, and/or tectosilicates.

4. The process as set forth in claims 1, 2 or 3, wherein the silicates are employed in the form of large granules or lumps.

5. The process as set forth in any one of claims 1 to 3 wherein the said material is gas concrete which is a mixture of 58% by weight $Ca_3Si_2O_7 \cdot H_2O$, and 42% by weight alpha-quartz.

6. A process as set forth in any one of claims 1 to 3 in which the reaction is carried at a temperature below the melting point of the alkaline solids.

7. A process as set forth in any one of claims 1 to 3 in which the reaction is carried out at a temperature up to 1,000° C.

8. A process as set forth in claim 7 in which the reaction is carried out at a temperature of 400° to 1,000° C.

* * * * *